United States Patent Office.

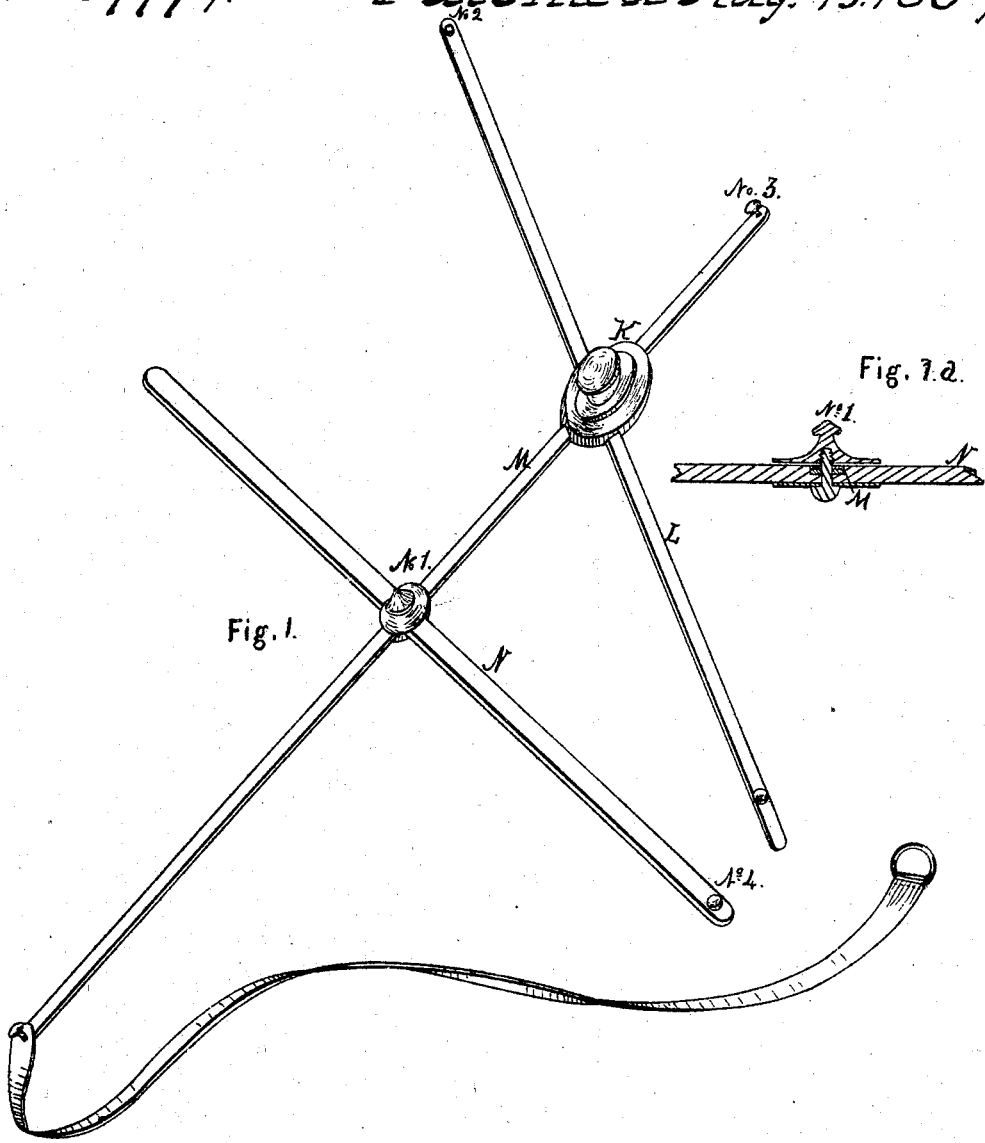

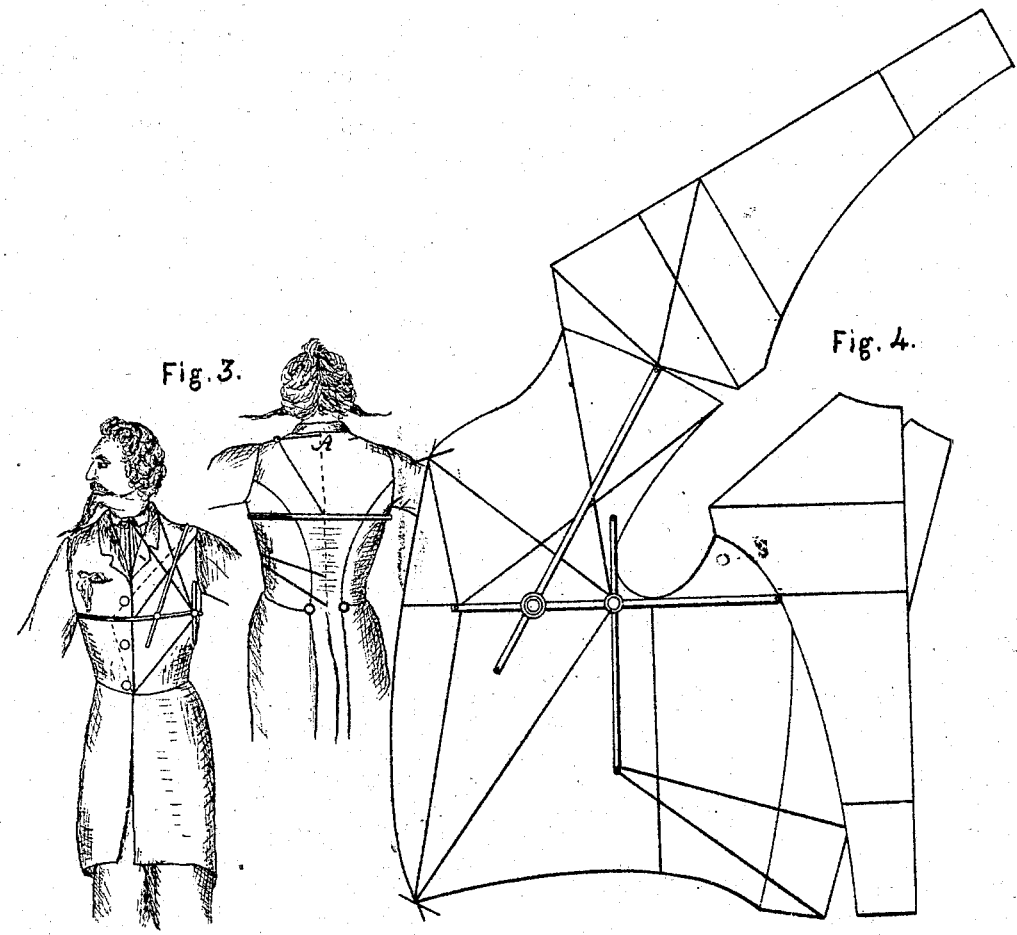

J. M. KRIDER, OF MADISON COURT-HOUSE, VIRGINIA.

Letters Patent No. 67,774, dated August 13, 1867.

---

IMPROVEMENT IN TAILORS' MEASURING INSTRUMENTS.

---

The Schedule referred to in these Letters Patent and making part of the same.

---

TO ALL WHOM IT MAY CONCERN:

Be it known that I, J. M. KRIDER, of Madison Court-House, Madison county, State of Virginia, have invented a new and useful improved Tailors' Measuring Instrument; and I do hereby declare the following to be a full, clear, and exact description of the same, sufficient to enable one skilled in the art to which it appertains to construct and use the same, reference being had to the accompanying drawings, which are made part of this specification, and in which the same letters indicate similar parts.

Figure 1 is a view of the instrument.

Figures 2 and 3 are front and rear views of the person on whom it is applied.

Figure 4 is a diagram showing the transfer of the measure to the cloth.

The instrument has an elastic metallic strip, which encircles the body under the arm-pits. Upon the bar is a cross-piece which ranges vertically in front of the left arm. A movable stud slips upon the metallic strip and is adjustable thereon, and a second metallic strip is adjustable on the movable stud. There are four points of departure on the instrument thus arranged from which measures are made and noted, and the instrument being detached from the person and laid upon the cloth, the distances obtained are laid down from the points of departure, as before, giving on the plane of the cloth the points by which to scribe and cut to fit the figure.

This instrument being placed in position, the distance is now taken from the several studs, designated as Nos. 1, 2, 3, and 4, to fixed points on the body indicated by letters, and after several measures are taken as above described, they are in the same manner transferred to the cloth, fig. 4. The instrument can be enlarged or diminished to suit all sizes, by means of the screw and grooved plate K, through which the breast-spring L and shoulder-spring M pass. The shoulder-spring is drawn out the desired length and fastened by means of the thumb-screw. The grooved plate K is moved horizontally on the breast-spring L. After taking a measure by the instrument, and before altering it for another, the distance is taken from No. 1 and No. 2 to the centre of the thumb-screw, which measures will give the adjustment of the instrument while that particular measure was taken. The plate K, at the junction of the breast-spring L and shoulder-spring M, is grooved for the passage of the said spring through it, the spring M slipping in the plate K, and the plate K on the spring L, so as to permit the requisite adjustment, which is maintained by the set-screw. The mode of securing the parts together at No. 1 is shown in section at fig. 1, a. A groove is cut across the brass bar N, which receives the spring L. A screw passes through into the set-nut No. 1, which forms one of the points of departure from which measurements are made. This screw and set-nut hold the spring L secure. When the screw is loosened the spring L may be taken out of its groove and rotated so as to bring it parallel with the bar N for convenience in shipping. The shoulder-spring M can then be taken out of its groove and laid on them to bring it into compact shape.

The object of the invention is to obviate the necessity of using curved measures, as they cannot be correctly transferred to the cloth. This instrument is used as a base both in taking the dimensions of the body and in transferring the same to the cloth, and as any line measured over a curve will, when flattened, apply to the plane of the cloth to fit thereon, an accuracy of fit must be the result when the same lines occupy the same place on the body that the instrument previously did. Consequently the proper pitch of shoulder or the cardinal A is correctly established according to the form of the person measured.

Having described my invention, what I claim therein as new, and desire to secure by Letters Patent, is—

The measuring apparatus above described, consisting of the shoulder-spring M, the breast-spring L, the bar N, the plate K, having the grooves and thumb-screw described, and the studs 1, 2, 3, and 4, all constructed, combined, and arranged substantially in the manner and for the purpose specified.

J. M. KRIDER.

Witnesses:
R. W. SPARKS,
W. I. CAVE.